United States Patent [19]
Deaver

[11] Patent Number: 5,523,665
[45] Date of Patent: Jun. 4, 1996

[54] ACTIVE DISCHARGE CIRCUIT FOR CHARGED CAPACITORS

[75] Inventor: David K. Deaver, Snohomish, Wash.

[73] Assignee: Fluke Corporation, Everett, Wash.

[21] Appl. No.: 330,049

[22] Filed: Oct. 26, 1994

[51] Int. Cl.[6] ............................ H02J 7/00; H01M 10/44; H01M 10/46
[52] U.S. Cl. ...................................... 320/1; 320/13
[58] Field of Search .................................. 320/1, 13, 15; 307/326; 363/124, 126; 340/540, 593, 560

[56] References Cited

U.S. PATENT DOCUMENTS 4,536,693  8/1985  Marek .......................................... 320/1

*Primary Examiner*—Peter S. Wong
*Assistant Examiner*—Gregory J. Toatley, Jr.

[57] ABSTRACT

An active discharge circuit provides for the discharge of filter capacitors in a power supply in the absence of a.c. line power. A detector provides a signal responsive to the removal of the pulsating d.c. charging voltage from the capacitors and a switch responsive to the detector signal closes, coupling an energy dissipating element, in the form of a resistor or a transistor, across the filter capacitor to dissipate its stored energy.

7 Claims, 1 Drawing Sheet

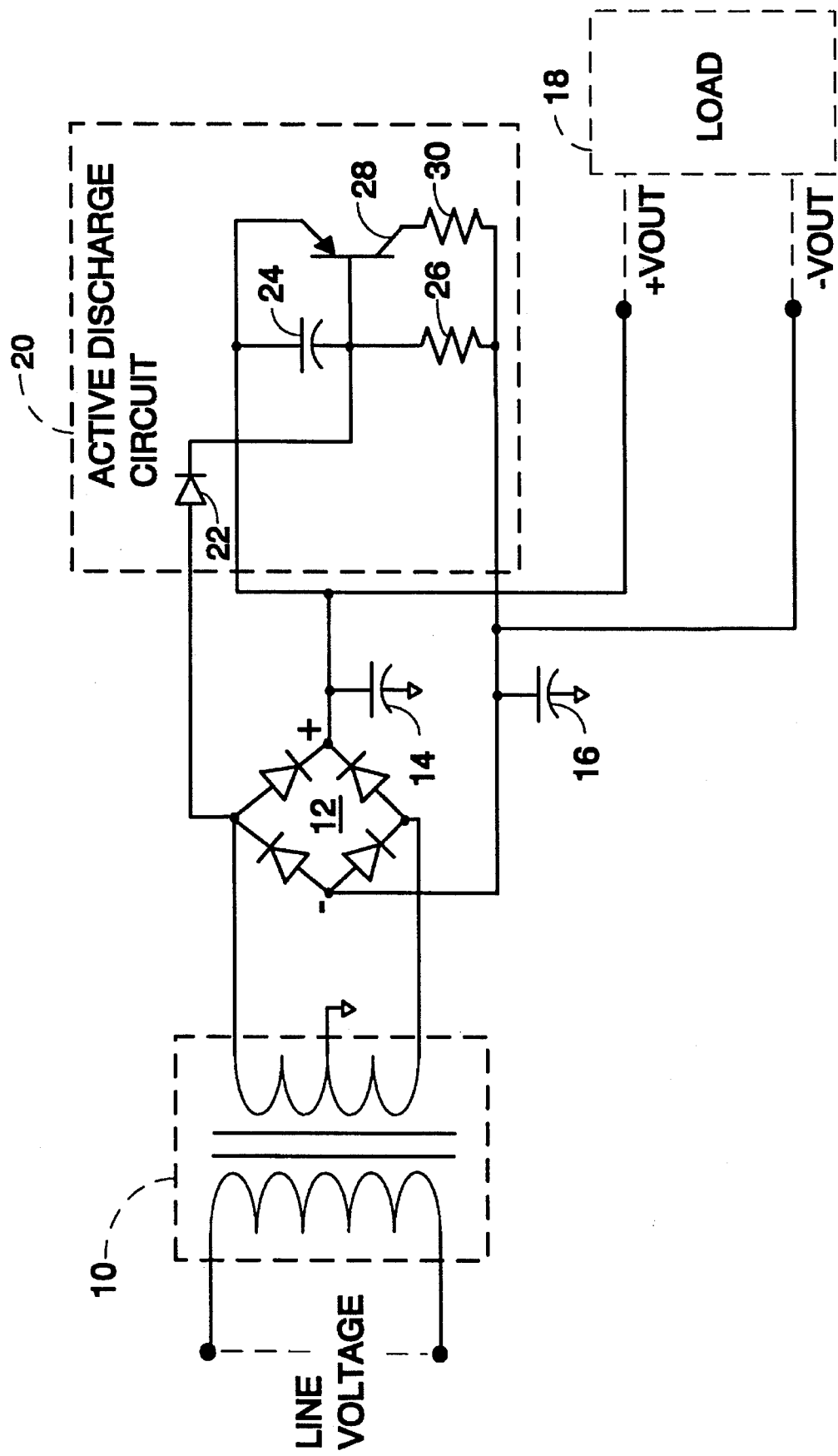
FIGURE

ACTIVE DISCHARGE CIRCUIT FOR CHARGED CAPACITORS

BACKGROUND OF THE INVENTION

This invention relates generally to electronic power supplies and in particular to a circuit for discharging charged capacitors in a power supply after a.c. power is removed.

The typical d.c. power supply used to supply d.c. voltages from an a.c. line voltage operates by converting the a.c. line voltage level to a desired a.c. voltage level using a transformer, rectifying the a.c. voltage to a pulsating d.c. voltage with semiconductor diodes, and filtering the pulsating d.c. voltage with capacitors to obtain the smoothed d.c. voltage. Capacitors, by virtue of their ability to store large amounts of electrical charge, function as filters by alternatively storing the charge from the peaks of the pulsating d.c. voltage which functions as the charging voltage and then releasing the charge between the peaks in the manner of a reservoir.

Capacitors have the ability to retain a substantial amount of stored charge long after the a.c. line power is removed if there is no path for the charge to bleed off, presenting a safety hazard to persons who may accidentally come in contact with the power supply. To address this concern, various techniques of discharging the capacitors have been devised. The simplest technique involves coupling a bleeder resistor in shunt across the capacitor. After the charging voltage is removed, the capacitor discharges through the bleeder resistor which dissipates the stored charge as heat. The disadvantages of the continuously-coupled bleeder resistor are that it continually dissipates energy, resulting in wasted energy which appears as heat build-up in the power supply and heavier duty components must be used to dissipate the heat continuously. An improved technique is to connect a relay in series with the bleeder resistor with the relay coil coupled to the a.c. line voltage in such a way that the relay contacts close and couple the bleeder resistor to the capacitor when the power supply is switched off. In this way, no power is dissipated in the bleeder resistor during the normal operation of the power supply. Relays that are capable of this task tend to be bulky and expensive and, as mechanical switching devices, may not achieve adequate reliability where there is a concern for safety. Semiconductor switches that perform the function of the relay have lacked a simple means of detecting the removal of the charging voltage from the capacitor when the power supply is switched off. Therefore, it would be desirable to provide an active discharge circuit using a relatively small number of inexpensive semiconductor components that is capable of detecting the removal of charging voltage and responsively coupling an energy dissipating element across the filter capacitor to facilitate its safe discharge.

SUMMARY OF THE INVENTION

In accordance with the present invention, an active discharge circuit is provided, which couples an energy dissipating element across the filter capacitors in a power supply upon sensing the removal of the charging voltage. The active discharge circuit is implemented with a small number of inexpensive components, minimizing component cost, circuit complexity, and physical volume while providing for the safe discharge of potentially hazardous amounts of charge stored in the capacitors. Because the energy dissipating element is decoupled from the capacitor during normal operation of the power supply, no energy is dissipated as wasted heat.

One object of the present invention is to provide an active discharge circuit which detects the removal of charging voltage and responsively couples an energy dissipating element across a capacitor.

Another object of the present invention is to provide an active discharge circuit which employs a small number of inexpensive, semiconductor components to detect the removal of charging voltage and responsively discharge the filter capacitor through an energy dissipating element.

An additional object of the present invention is to provide a detector which detects the removal of the pulsating d.c. charging voltage from a filter capacitor and sends a signal to a semiconductor switch which responsively couples a bleeder resistor across the filter capacitor to facilitate its discharge.

Other features, attainments, and advantages will become apparent to those skilled in the an upon a reading of the following description when taken in conjunction with the accompanying drawings.

BRIEF DESCRIPTION OF THE DRAWINGS

The single FIGURE is a circuit schematic diagram of an active discharge circuit in accordance with the present invention.

DETAILED DESCRIPTION OF THE INVENTION

Referring now to the FIGURE, there is shown a circuit schematic of the present invention as applied in a conventional power supply. A transformer 10 has a primary winding coupled to an a.c. (alternating current) line voltage and a secondary winding magnetically coupled to the primary winding to step up or step down the a.c. line voltage to a desired voltage level according to the primary to secondary turns ratio. The secondary winding has a center-tap and the center-tap is coupled to circuit Found. The secondary winding is further coupled to a full-wave rectifier 12 which converts the a.c. voltage developed across the secondary winding to a pulsating d.c. voltage at the terminals labeled + and −. Capacitors 14 and 16 are coupled to the + terminal and − terminal respectively of the full-wave rectifier 12 and function as filters to produce a d.c. voltage at a pair of output terminals labeled +VOUT and −VOUT. A load 18 is coupled to the terminals +VOUT and −VOUT.

Because the frill-wave rectifier 12 delivers a pulsating d.c. voltage, which functions as the charging voltage for the capacitors 14 and 16, at twice the line frequency, the capacitors 14 and 16 must have enough capacitance to meet a desired output ripple level when the power supply is delivering a predetermined amount of current to a load. Capacitance is measured in Farads which is the amount of charge stored per volt according to the formula $C=[q/V]$ where q is the mount of charge as measured in coulombs and V is the voltage across the capacitor. Because the power supply must deliver an output current I between peaks of the pulsating d.c. charging voltage, the size of the capacitor is generally governed by the maximum amount of tolerable "ripple" at the output which is the result of voltage drop by the steadily discharging filter capacitors between the peaks of the pulsating voltage. The amount of ripple is generally governed by the equation $C=[(I*t)/Vr]$ where I is the current delivered to the load, t is the time between peaks of the charge voltage, and Vr is the maximum acceptable ripple voltage. As the required current I delivered to the load increases, the relative size of the capacitor must be increased to store and release more charge in order to maintain the desired ripple voltage. It is common for power supply filter capacitors to have the ability to store a substantial amount of charge in response to the above mentioned design considerations.

If the voltages +VOUT and −VOUT are substantially higher than limits set by either engineering practice or by industry regulation, typically a value of 60 volts d.c., a safety concern arises. A common scenario to guard against involves a power supply on a service bench for repair which has been removed from its protective enclosure, and has had the load 18 disconnected from its output terminals. The capacitors 14 and 16, with no load to deliver their charge q to, may retain hazardous voltage levels for long periods of time after the a.c. line voltage has been removed.

An active discharge circuit 20 applied to the power supply circuit provides a means of discharging the capacitors 14 and 16 when the a.c. line voltage is removed which does not depend on the presence of a load 18 to operate. A diode 22 with an anode coupled to the secondary winding of transformer 10 provides a rectified d.c. voltage that indicates the presence of the a.c. voltage developed at the secondary winding. A cathode of the diode 22 is coupled to the junction of a capacitor 24 and a resistor 26 which are disposed in series between the +VOUT terminal and the −VOUT terminal. The junction of capacitor 24 and resistor 26 is further coupled to a base of a bipolar p-n-p transistor 28. Transistor 28 is implemented as a semiconductor switch with the base functioning as a control input, a collector coupled to the +VOUT terminal, and an emitter coupled to an energy dissipating element in the form of a resistor 30 which is in turn coupled to the −VOUT terminal. It will be obvious that an n-p-n bipolar transistor, a field effect transistor, or other semiconductor switching device can be employed as a semiconductor switch with appropriate attention to apply the particular device technology by one skilled in the art.

When the power supply is operating, a.c. voltage is present at the secondary winding of the transformer 10. The a.c. voltage is rectified by the diode 22 and maintains the voltage across the capacitor 24 and the base-emitter junction of the transistor 28 at lo substantially zero volts. Transistor 28 is therefore off during this time and no current flows through the emitter-collector junction to the resistor 30.

The combination of the diode 22, capacitor 24, and resistor 26 form a detector that generates a signal responsive to the removal of the a.c. voltage. At the moment that a.c. power is removed from the power supply, the pulsating d.c. charging voltage disappears and capacitor 24 begins to charge through the resistor 26. The time constant of the capacitor 24 charged by resistor 26 is substantially longer than the period of the pulsating d.c. charging voltage so that the voltage across capacitor 24 remains essentially zero between peaks of the charging voltage to prevent the switch from closing during the normal operation of the power supply. For a 60 hertz power line signal, the period of the pulsating d.c. charging voltage is 16.7 milliseconds. In the preferred embodiment, VOUT is 65 volts, −VOUT is −65 volts, capacitor 24 is 100 microfarads, and resistor 26 is 300,000 ohms. Capacitor 24 charges above 0.6 volts in approximately 140 milliseconds after a.c. power is removed, thereby mining on transistor 28, and allowing current to flow through the emitter-collector junction of the transistor to the resistor 30, allowing the capacitors 14 and 16 to discharge through the resistor 30 which has a value of 10,000 ohms in the preferred embodiment. This invention as shown is designed for applications in which the capacitor 14 has a capacitance equal to or larger than that of the capacitor 16. By requiring the capacitor 14 to have higher capacitance, it is assured that the capacitor 16 discharges first, leaving the capacitor 14 to finish discharging through the diode bridge 12 and the transformer 10 center tap to found thereby completely discharging the power supply. Alternatively, if the capacitor 16 is larger than the capacitor 14, it will be obvious to implement the active discharge circuit 20 to operate against the capacitor 16 rather than the capacitor 14 by coupling the active discharge circuit to the −Vout rail, reversing the relevant polarities and substituting an n-p-n transistor 28 for the p-n-p shown in the commercial embodiment Discharging a capacitor involves dissipating its stored charge, usually in the form of heat energy, by an energy dissipating element. In the preferred embodiment, the energy dissipating element is the resistor 30. The transistor 28 is operated as a switch by saturating the base circuit and turning the transistor 28 fully on in a 'saturated' condition. Because the transistor 28 is saturated, the voltage drop across the emitter-collector junction is relatively low and a substantially small potion of the energy is dissipated in the transistor 28. The capacitors 14 and 16 are each 1,700 microfarads. The discharge time t of the capacitors 14 and 16 is governed by the equation $t=[(C*V)/I]$ where C is the total capacitance in farads, V is voltage across each capacitor and I is the discharge current. Here, t=[3,400 microfarads*65 volts)/13 milliamperes]

t=17 seconds

The discharge time of 17 seconds is within the desired time limit to safely discharge the capacitors 14 and 16.

It will be obvious to those having ordinary skill in the art that many changes may be made in the details of the above described :preferred embodiments of the invention without departing from the spirit of the invention in its broader aspects. For example, the active discharge circuit may be applied to single-ended power supplies that have only a +VOUT or a −VOUT output. Furthermore, the active discharge circuit may be applied in power supplies where the size of the filter capacitor and the amplitude of the voltages +VOUT and −VOUT are not equal simply by using separate discharge circuits for each filter capacitor while utilizing common monitoring of the a.c. secondary voltage. Finally, the transistor 28 can be applied as the energy absorbing element, rather than the resistor 30, by injecting a predetermined amount of current into the base of the transistor 28, which allows the transistor 28 to operate in its linear region and operate as a current source or sink. Therefore, the scope of the present invention should be determined by the following claims.

What I claim as my invention is:

1. An active discharge circuit for discharging a filter capacitor when a pulsating d.c. charging voltage is removed, comprising:

(a) a detector for generating a signal responsive to the removal of said pulsating d.c. charging voltage, said detector comprising a diode, a resistor, and a capacitor wherein the time constant of the series combination of said resistor and said capacitor is substantially longer than the period of said pulsating d.c. charging voltage;

(b) an energy dissipating element; and (c) a semiconductor switch disposed in series between said filter capacitor and said energy dissipating element wherein said switch closes responsive to said signal.

2. An active discharge circuit according to claim 1 wherein said semiconductor switch comprises a bipolar transistor.

3. An active discharge circuit according to claim 2 wherein said transistor dissipates a substantial portion of the stored charge, from said filter capacitor.

4. An active discharge circuit according to claim 1 wherein said energy dissipating element dissipates a substantial portion of the stored charge from said filter capacitor.

5. In a power supply employing a filter capacitor to obtain a smoothed d.c. output voltage from a pulsating d.c. charging voltage, an active discharge circuit for discharging said filter capacitor when said pulsating d.c. charging voltage is removed, comprising:

(a) a detector for generating a signal responsive to the removal of said pulsating d.c. charging voltage, said detector comprising a diode, a resistor, and a capacitor wherein the time constant of the series combination of said resistor and said capacitor is substantially longer than the period of said pulsating d.c. charging voltage;

(b) an energy dissipating element; and (c) a transistor having a collector-emitter junction disposed in series between said filter capacitor and said energy dissipating element and a base coupled to said detector wherein said transistor conducts responsive to said signal.

6. An active discharge circuit according to claim 5 wherein said energy dissipating element dissipates a substantial portion of the stored charge from said filter capacitor.

7. An active discharge circuit according to claim 5 wherein said transistor dissipates a substantial portion of the stored charge from said filter capacitor.

* * * * *